Sept. 25, 1934.    F. B. BRADFORD    1,974,599
TIRE CARRIER FOR EXTENSION TRUNKS
Filed April 24, 1930    3 Sheets-Sheet 1

Inventor
~Floyd B. Bradford~
by Bair, Freeman & Sinclair
Attorneys

Witness
H. S. Menzenmaier

Sept. 25, 1934.　　　　F. B. BRADFORD　　　　1,974,599
TIRE CARRIER FOR EXTENSION TRUNKS
Filed April 24, 1930　　3 Sheets-Sheet 2
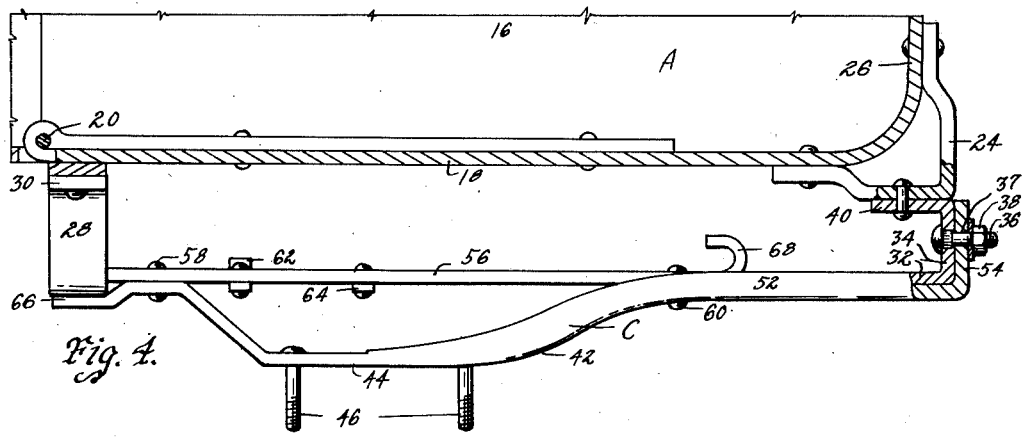
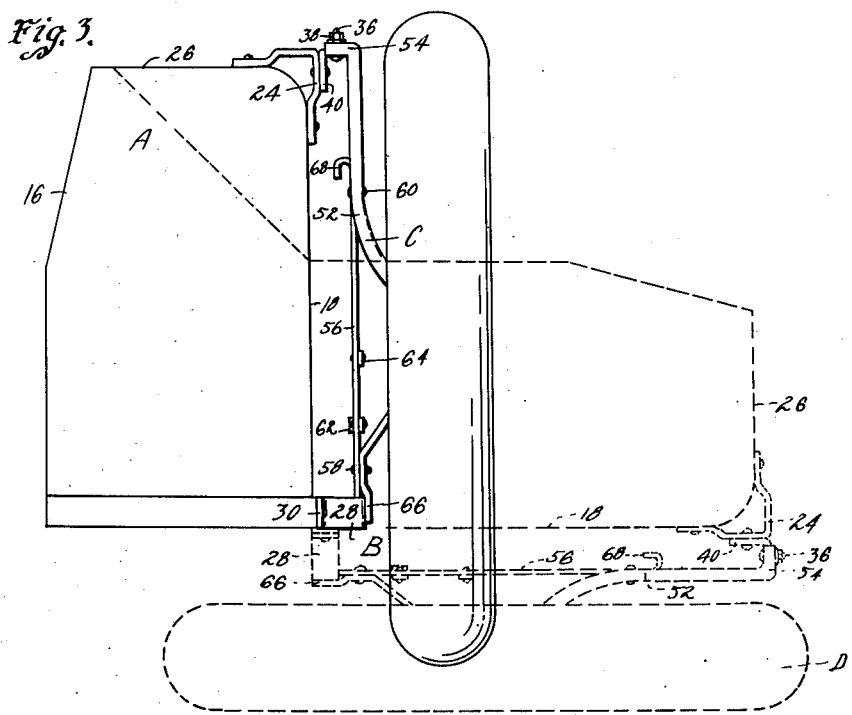
Inventor
~Floyd B. Bradford~
by Bair, Freeman & Sinclair
Attorneys
Witness
H. S. Munpennall Sept. 25, 1934.    F. B. BRADFORD    1,974,599
TIRE CARRIER FOR EXTENSION TRUNKS
Filed April 24, 1930    3 Sheets-Sheet 3
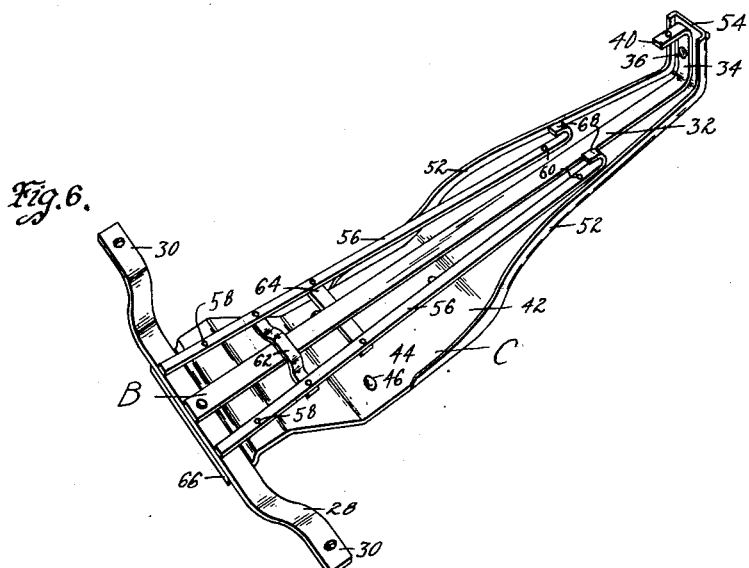
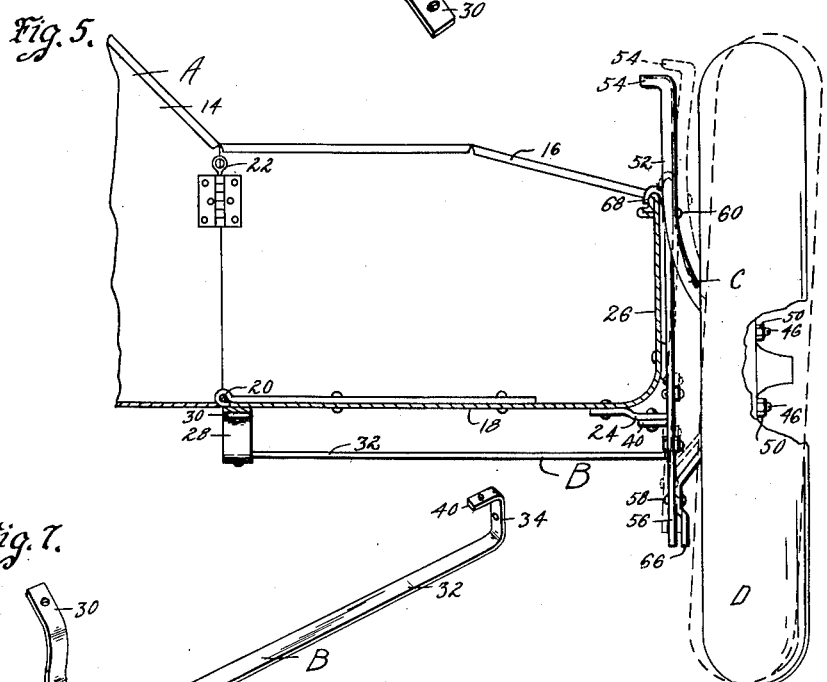
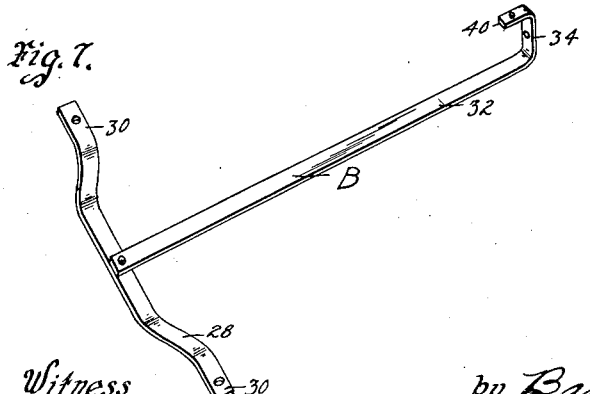

Patented Sept. 25, 1934

1,974,599

UNITED STATES PATENT OFFICE 1,974,599

TIRE CARRIER FOR EXTENSION TRUNKS

Floyd B. Bradford, St. Louis, Mo., assignor, by mesne assignments, to The Gabriel Kari-Keen Company, a corporation of Delaware Application April 24, 1930, Serial No. 446,935

9 Claims. (Cl. 224—29)

The object of my invention is to provide a tire carrier of simple, durable and inexpensive construction, especially adapted for use in connection with an automobile extension trunk wherein the position of the tire carrier may be changed from a normal vertical position to a normal horizontal position.

It may be here stated that tire carriers when mounted upon the movable section of an extension trunk meets undesirable features in that the spare tire and its carrier when arranged in horizontal position is quite difficult to get at and to remove the tire in case of emergency when necessary.

A further object of my invention is to provide a carrier adapted to be mounted upon the rear wall of a movable trunk section formed of two parts, one being permanently connected to the movable section of the trunk and the other movably mounted upon the other part of the carrier, whereby the movable part may be slid upon the fixed part and positioned at right angles thereto for temporarily supporting the spare tire in a vertical position for gaining easy access thereto.

A further object is to provide a tire carrier mounted on a support having two walls arranged at right angles to each other with the spare tire carrier mounted on one wall and adapted to be moved to position where it is adjacent to the other wall of the support and at right angles to its normal position, whereby easy access may be had to the spare tire for removing it from its carrier.

Still a further object is to provide hook elements upon the movable part of the carrier itself adapted to engage one wall of a support for temporarily retaining the spare tire and its carrier in a temporary position.

With these and other objects in view, my invention consists in the construction, arrangement and combination of the various parts of my device, whereby the objects contemplated are attained, as hereinafter more fully set forth, pointed out in my claims, and illustrated in the accompanying drawings.

Although the invention is susceptible of a variety of embodiments, it is unnecessary to fully describe and illustrate more than one in order to give a full understanding of the invention both from its structural and functional standpoints. Accordingly, I have illustrated a preferred and desirable embodiment of the invention in the accompanying drawings, in which:

Figure 3 is an end view of the extension trunk with a spare tire and tire carrier mounted thereon, the dotted line showing the normal horizontal position of the tire and its carrier when the trunk is extended.

Figure 4 is an enlarged side elevation of the tire carrier.

Figure 5 is a side view of the spare tire and its carrier supported in its temporary vertical position.

Figure 6 is perspective view of the complete carrier assembled; and

Figure 7 is a perspective view of the fixed part of the spare tire carrier.

Figure 1:
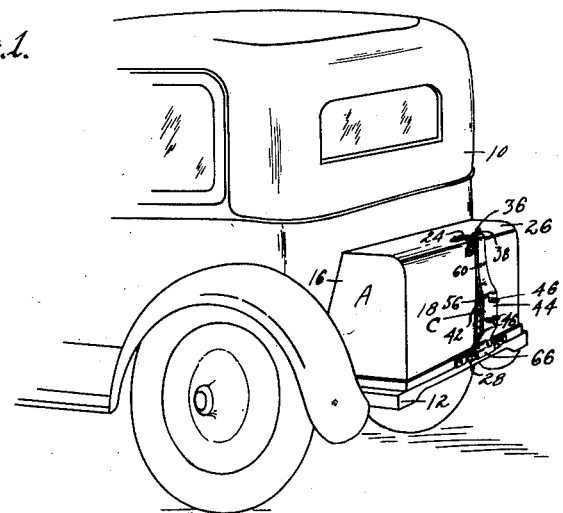
Figure 1 is a perspective view of a portion of an automobile with an extension trunk mounted thereon, having my improved tire carrier installed.

In the accompanying drawings, I have used the reference numeral 10 to indicate generally an automobile having a trunk rack 12 secured thereto and an extension trunk or luggage carrier A mounted upon the rack 12.

The trunk or luggage carrier A includes a fixed trunk section 14 and a movable trunk section 16. The movable section 16 is adapted to swing from a substantially vertical position to a substantially horizontal position. The vertical position is shown in Figure 1 of the drawings, and Figure 2 discloses the horizontal position.

The movable section 16 includes a back wall 18 which is vertical when the luggage carrier is not extended and is closed, and horizontal when the luggage carrier is extended and in horizontal position.

The fixed and movable sections 14 and 16 of the luggage carrier or trunk A are hinged together by means of a hinge connection 20 and retained in extended position by a suitable locking element 22.

Upon the rear wall 18 of the movable section 16, I mount my tire carrier.

Figure 2:
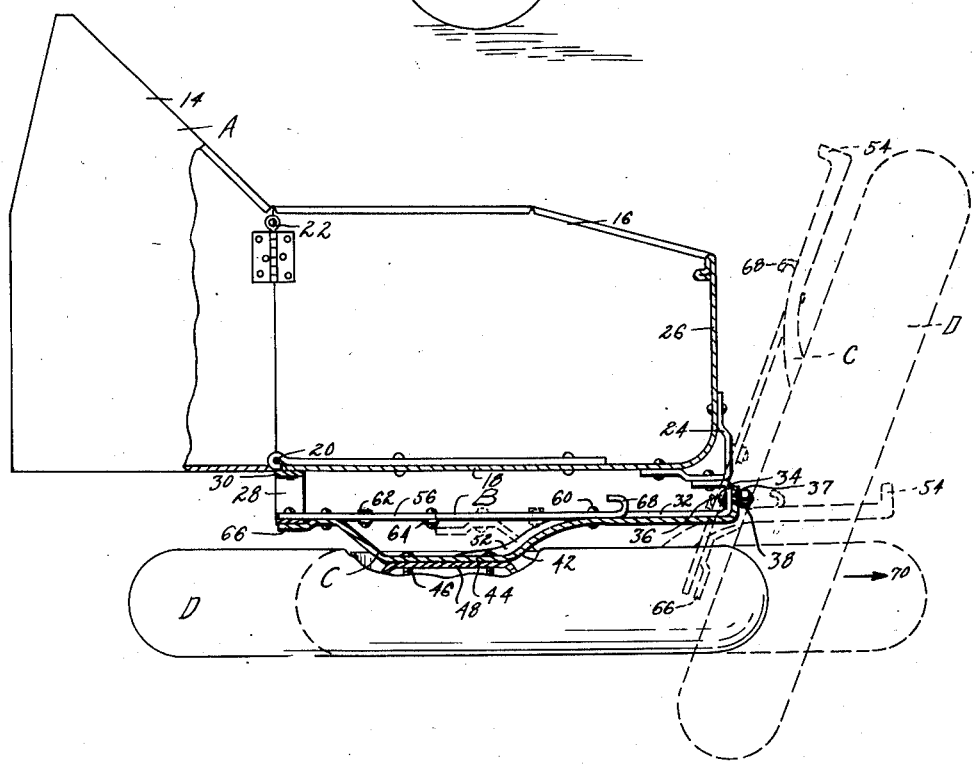
Figure 2 is a side elevation partly in section of an extension trunk with my spare tire carrier mounted thereon, two positions of the spare tire and a part of the carrier being shown in dotted lines.

A fitting or a piece of strap iron 24 is connected to the corner adjacent the upper edge of the back wall 18, and the top wall connected thereto. The top wall is referred to by the reference numeral 26. The top wall of the movable section becomes the end wall as shown in Figure 2, when the luggage carrier is extended.

My tire carrier is formed of two parts—a fixed part B and a movable part C.

The fixed part B includes a strap 28 having its extremities 30 riveted or bolted to the rear wall 18 of the movable section. The intermediate portion of the strap 28 between the extremities 30 is bent outwardly so as to be spaced away from the rear wall 18, as clearly shown in Figures 2 and 4 of the drawings.

A second strap 32 is riveted or otherwise secured to the center portion of the strap 28 and extends towards the top wall 26 of the movable section and is provided with an in-turned flange 34. The flange 34 is provided with a bolt 36 having a nut 38.

The purpose of the bolt 36 will be hereinafter more fully set forth.

The flange 34 has a down-turned portion 40 arranged for connection with the fitting or strap 24 as clearly shown in Figure 2. The connection between the down-turned portion 40 and the strap iron 24 may be by a rivet or bolt or any other suitable construction.

The parts just described form what I call the permanent or fixed part of my carrier. The part C of my carrier includes a metal stamping 42 in the form of a support. The stamping 42 is provided with an outwardly extending portion 44, which contains a plurality of stud bolts 46. The stud bolts 46 are arranged to extend through openings formed in the hub portion 48 of a spare tire of wire wheel construction.

Nuts 50 are adapted to be mounted upon the stud bolts 46.

The stamping 42 may be provided with in-turned flanges 52 for reinforcing purposes.

One end of the stamping is turned at right angles to the larger portion thereof as at 54. The portion 54 is provided with an opening 37 through which the bolt 36 extends.

The two parts of the carrier B and C are permanently connected together and held against movement when the bolt 36 is in position shown in Figure 2 of the drawings.

A pair of guide rods 56 are connected to the metal stamping 42 by rivets or the like 58 and 60.

The strap 32 of the part B is received between the two guide rods 56.

A pair of guide elements 62 and 64 connect the two guide rods 56 together, the guide element 62 extending on one side of the rod or strap 32, while the guide element 64 extends on the opposite side.

The lower end of the stamping 42 is outbent as at 66, so that with the ends of the guide rods 56, there is formed a receiving socket for the intermediate portion of the strap iron 28.

It will be noted that when the lower strap iron 28 is in the socket of the member C and the bolt 36 is in operative position, that the two parts of the carrier will be rigidly held together.

The upper ends of the two guide rods 56 are each provided with hook elements 68.

The spare tire is referred to by the reference character D.

The spare tire is mounted upon a complete wheel assembly, and my device is preferably adapted for use in connection with a wire wheel construction, although not necessarily so.

My tire carrier may be said to include two normal positions, that is a normal vertical position and a normal horizontal position.

It will be noted that in Figure 3, the spare tire and its carrier is shown in solid lines as being in a vertical position. This is a normal position when the luggage carrier is not extended. In the same figure, the dotted lines disclose the normal position of the spare tire and its carrier when the trunk or luggage carrier is in extended position. This is the normal horizontal position.

When the luggage carrier or extension trunk is filled with baggage and other items, it is desirable to gain easy access to the spare tire when necessary to change a tire. It is quite difficult to remove the spare tire while in horizontal position as shown in Figure 2 of the drawings.

In order to bring the spare tire to a temporary vertical position from its normal horizontal position, I have provided a two-part carrier. The practical operation of my two-part carrier will now be briefly described.

Assuming that it is necessary to remove the spare tire and the carrier is in its normal horizontal position, the nut 38 is removed from the bolt 36. This then permits the operator to engage the spare tire and move it longitudinally in the direction indicated by the arrow 70, the guide elements 62 and 64 sliding against the fixed part B and retaining the inner or lower end of the part C in engagement with the fixed part B.

The part C may be withdrawn to a point where the guide element 64 is clear of the bolt 36. When in this position, the guide element 62 engages the flange 34 of the bar 32. This limits the outward movement of the spare tire and its carrier.

The spare tire may then be swung with the guiding element 62 as a fulcrum or pivot and brought to a vertical position. When in vertical position, the entire tire is lifted a slight distance, so that the hook element 68 may engage over the upper edge of the end wall 26 as best illustrated in Figure 4 of the drawings. The hooks 68 then retain the movable part of the tire carrier in a temporary vertical position where easy access may be had to the spare tire for removing it.

After the tire has been changed, it is an easy matter to then return the spare tire and its carrier to normal horizontal position.

The carrier and its tire is lifted a slight distance as shown by dotted lines in Figure 4, and thereafter swung to horizontal position and slid longitudinally on the bar 32.

When the movable part of the carrier is returned to its normal position, it is necessary that the bolt 36 extend through the opening 37 in the portion 54 of the stamping 42. The nut 38 is then placed in position on the bolt 36 for preventing undesired movement of the movable part of the carrier.

It will be noted that the movable and fixed parts of the spare tire carrier are interlocked and yet capable when necessary of movement of one part relative to the other for permitting the spare tire to assume a temporary vertical position.

With my carrier, it is possible to carry the spare tire in a vertical normal position. It is likewise possible to carry the tire in a horizontal normal position. It is only when the spare tire is in a horizontal normal position that it is desirable to move it to a vertical temporary position for gaining easy access to the tire.

Some changes may be made in the arrangement and construction of the various parts of my tire carrier for extension trunks without departing from the real spirit and purpose of my invention, and it is my intention to cover by my claims, any modified forms of structure or use of mechanical equivalents, which may be reasonably included within their scope.

I claim as my invention:

1. The combination with an extensible trunk having a movable section adapted to swing from a vertical to a horizontal position, of a spare tire carrier mounted on said movable section and adapted to move therewith from a normal vertical to a normal horizontal position, means whereby the carrier may be moved to temporary vertical position for gaining access thereto when the movable section of the trunk is in horizontal position and a hook on the carrier to temporarily engage over the upper rear edge of the movable section when in such horizontal position.

2. The combination with an extensible trunk having a movable section adapted to swing from a vertical to a horizontal position, of a two-part spare tire carrier, one part rigidly mounted on and movable with said movable section from a vertical to a horizontal position, the second part of said carrier being movable with and slidably mounted on said first part, whereby it may be moved from a normal horizontal position to a temporary vertical position for gaining easy access to a spare tire carried thereby, and hook means on said second part engageable with the rear wall of said movable section for retaining said second part in said temporary vertical position.

3. The combination with an extensible trunk having a movable section adapted to swing from a vertical to a horizontal position, of a two-part spare tire carrier, one part rigidly mounted on and movable with said movable section from a vertical to a horizontal position, the second part of said carrier being movable with and slidably mounted on said first part, whereby it may be moved from a normal horizontal position to a temporary vertical position for gaining easy access to a spare tire carried thereby, and a hook element on said second part adapted to hook over one edge of the movable section for retaining said second part in said last position.

4. A two-part spare tire carrier movable bodily from a normal vertical position to a normal horizontal position, one part comprising a bar having a T head at one end thereof, means at the other end of said bar and at the ends of said T head for anchoring said ends on a supporting surface, and the other part having one end engageable with said head at spaced points and a portion thereadjacent slidable on said bar and adapted to pivot on said other end thereof when slid to said end.

5. For use with a movable support, a two-part spare tire carrier movable bodily with said support from a normal vertical position to a normal horizontal position, one part comprising a bar having a T head at one end thereof, means at the other end of said bar and at the ends of said T head for anchoring said ends on said support and the other part having one end engageable with said T head at points spaced on each side of said bar, a portion adjacent said T head slidable on said bar and adapted when slid to said other end thereof to pivot on the bar to a temporary vertical position and hook means temporarily cooperating with said support for retaining said other part in its temporary vertical position.

6. For use with a support having two walls arranged at right angles to each other, a two-part spare tire carrier mounted on one wall of said support, one of said parts comprising a supporting bar, guide connections between the other of said parts and said bar comprising a cross bar above said supporting bar and a second cross bar below said supporting bar, said second cross bar being spaced from said first cross bar, said other part being pivotal about said first cross bar after it is moved to one end of said supporting bar whereby to swing said other part to a temporary position adjacent the other wall of said support and means for temporarily hooking said second part to said other wall for gaining easy access to a spare tire carried thereby.

7. The combination with an extensible trunk having a movable section adapted to swing from a vertical to a horizontal position, of a two-part spare tire carrier movable bodily with said movable section from a vertical to a horizontal position, one of said parts comprising a supporting bar secured to said movable section and having a closed end and guide connections between the other of said parts and said bar comprising a cross bar above said supporting bar and a second cross bar below said supporting bar, said second cross bar being spaced from said first cross bar and movable to a position beyond said closed end.

8. For use with a support having two walls arranged at right angles to each other, a two-part spare tire carrier mounted on one wall of said support comprising a supporting bar having a closed end, guide connections between the other of said parts and said supporting bar comprising a cross bar above said supporting bar and a second cross bar below said supporting bar, said second cross bar being spaced from said first cross bar and movable to a position beyond said closed end whereby said other part may be swung to a temporary position adjacent the other wall of said support for gaining easy access to a spare tire carried thereby and means on said second part for engaging one of the fixed ends of said first part to retain the second part fixed relative to the first part when the second part is in normal position.

9. For use with a support having two walls arranged at right angles relative to each other, a two-part spare tire carrier mounted on one wall of said support, one of said parts comprising a supporting bar having a fixed end and a closed end, both secured to said last mentioned wall, guide connections between the other of said parts and said supporting bar comprising a cross bar above said supporting bar and a second cross bar below said supporting bar, said second cross bar being spaced from said first cross bar and being movable to a position beyond said closed end whereby said other part may be swung to a temporary position adjacent the other wall of said support for gaining easy access to a spare tire carried thereby, means on said second part for engaging the fixed end of said first part to retain the second part fixed relative to the first part, said second part having a lug to engage the closed end of said first part when the second part is in normal position and means for securing said lug to said closed end.

FLOYD B. BRADFORD.